United States Patent [19]

Frame et al.

[11] Patent Number: 5,120,453
[45] Date of Patent: Jun. 9, 1992

[54] OXIDATIVE REMOVAL OF CYANIDE FROM AQUEOUS STREAMS

[75] Inventors: Robert R. Frame, Glenview; Tom N. Kalnes, La Grange; Mark D. Moser, Elk Grove Village, all of Ill.

[73] Assignee: UOP, Des Plaines, Ill.

[21] Appl. No.: 632,798

[22] Filed: Dec. 24, 1990

[51] Int. Cl.$^5$ .............................................. C02F 1/78
[52] U.S. Cl. .................. 210/759; 210/748; 210/760; 210/763; 210/904
[58] Field of Search ............... 210/748, 758, 759, 760, 210/763, 904

[56] References Cited

U.S. PATENT DOCUMENTS

| | | | |
|---|---|---|---|
| 2,918,426 | 12/1959 | Quiguerez et al. | 208/206 |
| 2,951,797 | 9/1960 | Sharp | 210/763 |
| 2,966,453 | 12/1960 | Gleim et al. | 208/206 |
| 3,029,201 | 4/1962 | Brown et al. | 210/763 |
| 3,252,892 | 5/1966 | Gleim | 208/206 |
| 3,284,351 | 11/1966 | Dajani et al. | 210/763 |
| 3,502,576 | 3/1970 | Muller et al. | 210/763 |
| 3,586,623 | 6/1971 | Kuhn | 210/763 |
| 3,980,582 | 9/1976 | Anderson et al. | 252/428 |
| 4,290,913 | 9/1981 | Frame | 252/428 |
| 4,446,029 | 5/1984 | Betermier et al. | 210/748 |
| 4,512,900 | 4/1985 | Macur et al. | 210/904 |
| 4,537,686 | 8/1985 | Borbely et al. | 210/713 |
| 4,615,873 | 10/1986 | Devuyst et al. | 423/367 |
| 4,622,149 | 11/1986 | Devuyst et al. | 210/717 |
| 4,743,381 | 5/1988 | Bull | 210/763 |

OTHER PUBLICATIONS

R. Gierzatowicz et al., *Effluent and Water Treatment Journal*, 25 26-31 (1986).

Chen et al., (Paper 81c presented at the 1990 AIChE Summer National Meeting, San Diego, Calif., Aug. 21, 1990).

*Primary Examiner*—Peter Hruskoci
*Attorney, Agent, or Firm*—Thomas K. McBride; Eugene I. Snyder

[57] ABSTRACT

The oxidation of cyanide using oxygen as the oxidizing agent can be effected under mild reaction conditions when certain metal chelates are used as catalysts. Especially effective chelates are metal phthalocyanines, particularly where the metal is vanadium or a member of the iron group metals. The oxidation can be effected homogeneously using water soluble metal chelates, or can be performed heterogeneously, especially in a continuous fashion using a packed bed reactor, by using suitable water-insoluble metal chelates, especially when supported on appropriate carriers.

25 Claims, 1 Drawing Sheet

OXIDATIVE REMOVAL OF CYANIDE FROM AQUEOUS STREAMS

BACKGROUND OF THE INVENTION

It is only in relatively recent years that society has appreciated the impact and consequences of the fact that we live in a closed ecological system. With an increase in human population and, perhaps more importantly, an increase in industrial activity the effects of ecological changes have become more apparent. One area which has received a great deal of attention is that of water quality, which may be the result of the belated recognition that not only is water of a suitable quality for human consumption a limited resource, but that good water quality is an important, if not critical, factor in the ecological chain. Consequently attention has turned not only to purification of water in local water supplies, but also to limiting the discharge of materials into streams and acquifers generally.

The classes of noxious materials (pollutants) in aqueous discharges vary over an enormously broad spectrum. Among the inorganic pollutants those toxic to a broad spectrum of biological species are especially dangerous. Although heavy metals such as lead, cadmium, and arsenic often are the first culprits thought of, inorganic water soluble cyanide is in a comparably dangerous class because of the generally low tolerance of life forms to cyanide.

The sources of cyanide are many and varied and include iron and steel manufacturing, petroleum and coal pyrolysis processes, the photographic, chemicals, and pharmaceutical industries, precious metal mining and metal finishing, including electroplating and galvanizing. For example, cyanide arises in iron and steel manufacture by reduction of carbonate in the presence of carbon and nitrogen. In power plants coal burning may afford coke oven gas with a hydrogen cyanide concentration on the order of 2 grams per liter. Cyanide solutions are an important component of electroplating and galvanizing, and wash water streams resulting from post-coating treatment often contain significant quantities of cyanide. The widespread prevalence of cyanide in industrial effluents coupled with their near universal toxicity to life has made it imperative to minimize cyanide concentration in aqueous streams.

It appears that the most prevalent methods of cyanide removal are based on the oxidation of cyanide. See generally R. Gierzatowicz et al., *Effluent and Water Treatment Journal*, 25, 26-31 (1986). Oxidation with chlorine or hypochlorite seems to be industrially the most commonly employed method. The first stage in this oxidation is the formation of cyanogen chloride, CICN, itself a rather toxic gas, but which is hydrolyzed at a high pH to the less toxic cyanate, CNO. Cyanate is itself hydrolyzed to carbon dioxide and ammonia at low pH, or is further oxidized to carbon dioxide and nitrogen. Another oxidative method uses peroxides such as hydrogen peroxide, Caro's acid, peracetic acid, and so on, as the oxidizing agent. The advantages of this approach vis a vis the chlorine or hypochlorite based process is the lack of toxic byproducts and the formation of environmentally neutral species from the peroxides. A disadvantage is the long reaction times necessary for adequate oxidation. However, cupric ions supposedly act as catalysts for peroxide oxidation. Other oxidizing agents based on Mn(VII) and Cr(VI) also have been used.

More recently there has been described the oxidation of both free and complex cyanide in aqueous streams by a mixture of sulfur dioxide or alkali/alkaline earth metal sulfites (including bisulfites and metabisulfites) and air or water in the presence of a water-soluble copper(II) catalyst at a pH between 5 and 12; U.S. Pat. No. 4,537,686. [Although copper is designated as "$Cu^+$" in the issued patent, the fact that most cuprous salts are water insoluble and that Cu(I) is readily oxidized strongly suggests that Cu(II) actually was used.] Using rather high weight ratios of copper to cyanide on the order of about 0.25, final cyanide concentrations could be reduced to under 0.1 parts per million. More recently Chen et al. (Paper 81c presented at the 1990 AIChE Summer National Meeting, San Diego, Calif., Aug. 21, 1990) presented data on the oxidation of aqueous streams containing cyanide at 100 ppm using a soluble copper catalyst in conjunction with sodium sulfite and air over activated carbon in a trickle bed reactor at normal pressure. Initially the copper/cyanide molar ratio was about 0.25, but since copper(II) hydroxide precipitated on the carbon surface, it was found that a copper/cyanide maintenance ratio of about 0.1 was quite adequate. Although the authors characterize the activated carbon as a catalyst, this conclusion is far from clear according to the data. Thus, although the authors showed that use of a bed of activated carbon leads to 99% removal of cyanide, beds of both a molecular sieve and glass beads were almost as effective in affording about 80% removal. The improved result with activated carbon could readily be attributed to the extent of copper(II) deposition on the packed bed and its dispersion on the bed materials.

A continuous method for the removal of cyanide using air or oxygen as the oxidizing agent at ambient temperatures and pressures is highly desirable. Although the foregoing references provide a start, much remains before a commercially viable system is operative. In particular, it is often desirable that the catalyst either be heterogeneous, or if homogeneous readily separable, in order to avoid contamination of the effluent by the catalyst itself as well as to minimize process cost associated with catalyst consumption. It also is desirable that the catalyst be relatively insensitive to as large a class of contaminants likely to accompany cyanide as is possible. The process should be capable of efficient operation at atmospheric pressure and preferably as close to ambient temperature as possible in order to minimize energy requirements. Finally, it is desirable for such a process to oxidize the cyanide over a rather wide range of initial cyanide concentrations, and to have the capability of oxidizing 90% or more of the cyanide present.

What we have observed is that a rather broad class of metal chelates are quite effective as catalysts in oxidizing cyanide using only air as the oxidizing agent. These metal chelates can be used either in a soluble form or water-insoluble form so as to afford the opportunity of either homogeneous or heterogeneous catalytic oxidative removal of cyanide, depending upon the needs and/or preferences of the user. We furthermore have found that the oxidation of cyanide as catalyzed by the metal chelates of our invention lead to the formation of carbon dioxide and nitrogen as well as that of isocyanate. Processes which are based on the use of the metal chelates as catalysts for the oxidation of cyanide are effective over rather large initial concentration ranges of cyanide can be readily tailored to particular effluent streams, and consequently are quite versatile.

SUMMARY OF THE INVENTION

The purpose of this invention is to reduce the cyanide concentration in aqueous streams using as mild an oxidant as possible, and preferably oxygen, in an economical process capable of treating a multitude of streams and adaptable to a variety of process requirements. An embodiment comprises oxidizing the cyanide by contacting the cyanide-laden stream with an oxidizing agent in the presence of a catalyst which is a metal chelate. In a specific embodiment the chelate is a phthalocyanine of cobalt, vanadium, nickel, or iron. In a more specific embodiment the catalyst is a chelate of a sulfonated cobalt phthalocyanine dispersed on carbon and the oxidizing agent is oxygen. In yet another embodiment the catalyst is a water-soluble polysulfonated cobalt phthalocyanine. Other embodiments will be apparent from the ensuing description.

DESCRIPTION OF THE INVENTION

Figure 1:
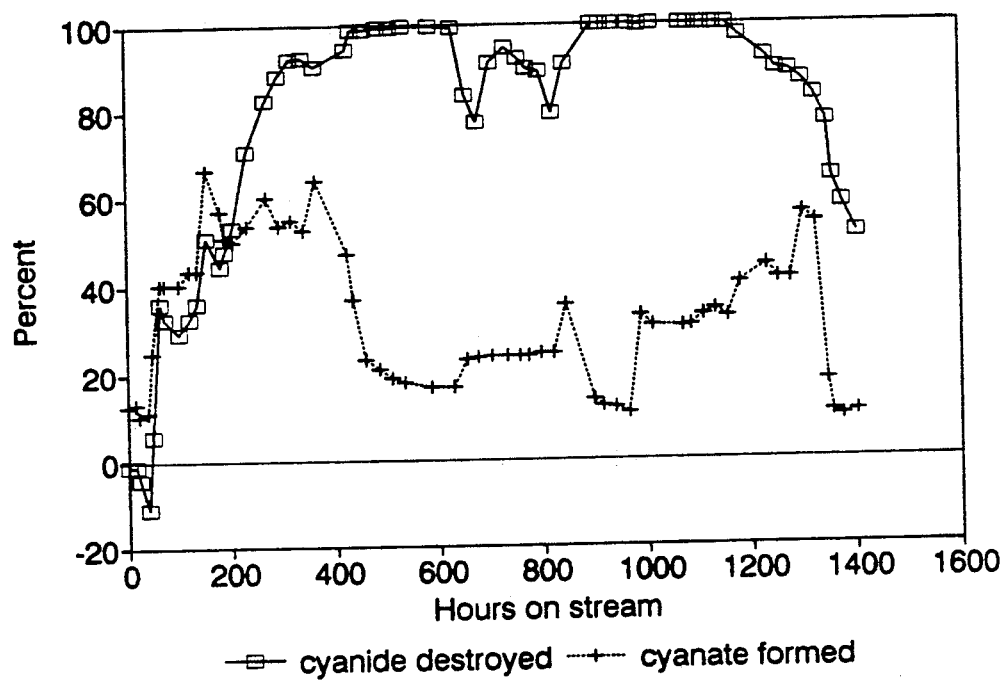
FIG. 1 is a graphic representation of the results in Table 3, showing the percent cyanide oxidized and percent cyanate formed as a function of time.

The need to remove cyanide from various waste water streams has been elaborated upon above. Although various methods currently are available, there remains a need for a process which is at once sufficiently flexible to be applicable to many kinds of aqueous streams, to be applicable to varying concentrations of cyanide, to be capable of being adaptable to both continuous and batch processes, to be catalytic in nature, and to be capable of using oxygen as the oxidizing agent. We have found that a class of metal chelates previously used in the oxidation of sulfides, especially mercaptans, are also effective in the oxidation of cyanides. This observation was rather unexpected, particularly in view of the experience that cyanide at low concentrations tended to deactivate these metal chelates in the oxidation of mercaptans to disulfides. Accordingly, it was not expected that these same metal chelates would oxidize cyanides, much less do so effectively under the conditions described within.

It needs to be explicity understood and recognized that the permissible cyanide level remaining after treatment of the water stream is variable. For example, the proposed standards for drinking water sets a level of 0.2 ppm as the maximum permissible. If an electroplater of common metals discharges to a publicly owned treatment waterwork less than 38,000 liters per day, the 4-day average of cyanide amenable to treatment is not more than 2.7 ppm. For the same type facility discharging 38,000 liters or more per day, the 4-day average can not exceed 1.0 ppm of total cyanide. From the foregoing it should be clear that a variety of final cyanide levels will be found acceptable; no single standard may be stated.

Any aqueous stream containing inorganic cyanide is suitable for use in this invention. This is not to say that the nature of the water-soluble cyanide is immaterial; those cyanides which ionize to afford cyanide ions are more readily oxidized than those cyanides which are tightly complexed, as, for example, ferrocyanides. Thus, aqueous streams containing hydrogen cyanide or the alkali metal salts of cyanides, alkaline earth cyanides, and other cyanides, are more susceptible to oxidation than the complex cyanides. Nonetheless, even complex cyanides have a measurable dissociation constant and their oxidation may be effected by our invention, although the rate of oxidation can be expected to be much less than that of simple metal cyanides. The foregoing can be most readily understood if the oxidation proceeds most rapidly with dissociated cyanide ion, which is a working hypothesis whose veracity can not be vouched for at present.

Our invention is applicable most desirably to streams containing up to about 500 parts per million cyanide, although it is preferably applicable to streams containing no more than about 100 ppm cyanide. Many streams contain cyanide on the order of 5 ppm, and for these streams our invention is especially effective. However, it needs to be clearly understood that our invention may be applicable to streams containing as much as several percent cyanide, although such streams may be an uncommon occurrence. Cyanide-laden aqueous streams include waste streams from metal plating industries, from photography laboratories, steel mills, chemicals waste streams, and streams from the mining industry. However, the nature of the cyanide-containing streams which can be treated by the process of our invention is not particularly critical in any way.

The key to our invention is our discovery that certain metal chelates are effective in catalyzing the oxidation of cyanide by such oxidizing agents as air itself. The metal chelates which act as catalysts are known to the art as effective in catalyzing the oxidation of mercaptans contained in a sour petroleum distillate to disulfide. The metal chelates include the metal compounds of tetrapyridinoporphyrazine described in U.S. Pat. No. 3,980,582, e.g., cobalt tetrapyridinoporphyrazine; porphyrin and metaloporphyrin catalysts as described in U.S. Pat. No. 2,966,453, e.g., vanadium tetraphenylporphin carboxylate; corrinoid catalysts as described in U.S. Pat. No. 3,252,892, e.g., manganese corrin sulfonate; chelate organometallic catalysts such as described in U.S. Pat. No. 2,918,426, e.g., the condensation product of an aminophenol and a metal of Group VIII; and the metal phthalocyanines as described in U.S. Pat. No. 4,290,913, etc. As stated in U.S. Pat. No. 4,290,913, metal phthalocyanines are a preferred class of metal chelates.

The metal phthalocyanines which can be employed to catalyze the oxidation of mercaptans generally include magnesium phthalocyanine, titanium phthalocyanine, hafnium phthalocyanine, vanadium phthalocyanine, tantalum phthalocyanine, molybdenum phthalocyanine, manganese phthalocyanine, iron phthalocyanine, cobalt phthalocyanine, platinum phthalocyanine, palladium phthalocyanine, copper phthalocyanine, silver phthalocyanine, zinc phthalocyanine, tin phthalocyanine, and the like. The iron-group (Group VIII metals) phthalocyanines and vanadium phtholocyanines are particularly preferred, and among the iron-group phthalocyanines cobalt phthalocyanine is especially preferred. The ring substituted metal phthalocyanines are generally employed in preference to the unsubstituted metal phthalocyanine (see U.S. Pat. No. 4,290,913), with the sulfonated metal phthalocyanine being especially preferred, e.g., cobalt phthalocyanine monosulfate, cobalt phthalocyanine disulfonate, etc. The sulfonated derivatives may be prepared, for example, by reacting cobalt, vanadium or other metal phthalocyanine with fuming sulfuric acid. While the sulfonated derivatives are preferred, it is understood that other derivatives, particularly the carboxylated derivatives, may be employed. The carboxylated derivatives are readily prepared by the action of trichloroacetic acid on the metal phthalocyanine.

The degree of derivatization importantly affects the solubility of the metal chelates, such as the phthalocyanines, of this invention. Using the phthalocyanines as a specific example, monosulfonation affords a chelate which still is water insoluble (under 0.1 weight percent) and which quite suitably can be dispersed on a catalyst support or carrier for use in heterogeneous catalysis of cyanide in aqueous streams. On the other hand, polysulfonation up to 3-4 sulfonic acid residues per phthalocyanine affords a metal chelate which is water soluble and which is readily adaptable for use as a homogeneous catalyst under aqueous reaction conditions. The soluble metal chelates could be used, for example, in toxic waste storage bonds or in other storage facilities, especially in conjunction with aeration.

For use in a packed bed, heterogeneous catalytic operation the metal phthalocyanine catalyst can be adsorbed or impregnated on a solid adsorbent support in any conventional or otherwise convenient manner. In general, the support or carrier material in the form of spheres, pills, pellets, granules or other particles of uniform or irregular shape and size is dipped, soaked, suspended or otherwise immersed in an aqueous or alcoholic solution and/or dispersion of the metal phthalocyanine catalyst, where the aqueous or alcoholic solution and/or dispersion may be sprayed onto, poured over, or otherwise contacted with the adsorbent support. In any case, the aqueous solution and/or dispersion is separated, and the resulting composite is allowed to dry under ambient temperature conditions, or dried at an elevated temperature in an oven or in a flow of hot gases, or in any other suitable manner. In general, up to about 25 weight percent metal phthalocyanine can be adsorbed on the solid adsorbent support or carrier material and still form a stable catalytic composite. A lesser amount in the range from about 0.1 to about 10 weight percent generally forms a suitably active catalytic composite, although the activity advantage derived from metal phthalocyanine concentrations in excess of about 2-5 weight percent generally does not warrant the use of higher concentrations.

The adsorbent support which may be used in the practice of this invention can be any of the well known adsorbent materials generally utilized as a catalyst support or carrier material. Preferred adsorbent materials include graphite and the various charcoals produced by the destructive distillation of wood, peat, lignite, nutshells, bones, and other carbonaceous matter, and preferably such charcoals as have been heat-treated or chemically treated or both, to form a highly porous particle structure of increased adsorbent capacity, and generally defined as activated carbon or charcoal. Said adsorbent materials also include the naturally occurring clays and silicates, e.g., diatomaceous earth, fuller's earth, kieselguhr, attapulgus clay, feldspar, montmorillonite, halloysite, kaolin, and the like, zeolitic and molecular sieve materials generally and also the naturally occurring or synthetically prepared refractory inorganic oxides such as alumina, silica, zirconia, thoria, boria, etc., or combinations thereof like silica-alumina, silica-zirconia, alumina-zirconia, etc. Any particular solid adsorbent material is selected with regard to its stability under conditions of its intended use. With regard to its intended use in aqueous systems, perhaps the most important property of the adsorbent support is its insolubility as well as complete unreactivity in aqueous systems. Charcoal, and particularly activated charcoal, is preferred because of its capacity for metal chelates, and because of its stability under treating conditions.

Although the process which is our invention can be designed to operate satisfactorily under ambient conditions of temperature and pressure, this is not to say that these are the only conditions under which the process can be suitably effected, or even that these are preferable reaction conditions for the oxidation of cyanide by oxygen in the presence of the metal chelates of this invention. In fact, one of the strengths of our invention is that it can be utilized under a very wide range of conditions. Thus, as to reaction temperature, temperatures may be as low as about 20° C. and certainly as high as 95° C. If the reaction is conducted at 1 atmosphere pressure, one is limited to an upper temperature of about 95° C. for aqueous systems because of the increased vapor pressure arising from water. On the other hand, if one is willing to operate at a higher pressure, or if other considerations make it desirable to operate at a higher pressure, then temperatures in excess of 95° C. may be used. It is certainly true that the higher the reaction temperature the faster the cyanide oxidation will proceed. Similarly, the higher the partial pressure of oxygen—assuming its use as the sole oxidant—the faster will the reaction proceed. Consequently there are some advantages to working at partial pressures of oxygen higher than 1 atm. and at as high a temperature as possible under the reaction pressures employed. As a practical matter, it is believed that temperatures in excess of about 150° C. and pressures in excess of about 10 atmospheres will prove only marginally beneficial and that no real economic benefit will accrue from practicing the invention herein under more stringent conditions.

As previously mentioned, the preferred oxidizing agent is oxygen, whether from air or from an oxygen-enriched gas. Other oxidants also may be used, in particular hydrogen peroxide and ozone, but these are not seen to be as generally convenient as that of oxygen. Where the cyanide content of the aqueous stream is no more than about 15 ppm, one can readily use air at atmospheric pressure as the source of oxygen, for under these conditions the level of dissolved oxygen will be sufficient for the concentration of cyanide present. On the other hand, one can go to higher pressures to effect higher concentrations of dissolved oxygen. However, we have found it more effective to continually bubble oxygen through the cyanide-laden aqueous stream in the reaction zone in order to provide sufficient oxygen for oxidation of cyanide at levels considerably higher than 15 ppm. Adequate dispersal of oxygen in the aqeuous feedstock in contact with the metal chelate as catalyst is of considerable importance, but since appropriate methods of dispersal are well known in the art these will not be further discussed. Where a peroxide, such as hydrogen peroxide, is used as the oxidizing agent it can be conveniently added to the feedstock in an amount adequate to completely oxidize the cyanide present.

The pH of the reaction medium has an important influence on the course and success of our invention. On the one hand the rate of oxidation appears to decrease with increasing pH, which favors practicing the invention at as low pH as possible. On the other hand, low pH leads to HCN evolution which is to be avoided because of the high toxicity of this gas. Consequently a balance must be reached between reaction rate and safety. As a practical matter, our invention can be performed between the pH associated with the onset of HCN evolution, which is in the range of about 7.0–8.5, and pH 14. However, the pH range between about 9 and 12 appears to be the most desirable operational range for the practice of our reaction.

Although it is believed that temperature, oxidant concentration, and pH are the most important variables in the practice of our invention, other factors such as residence time, cyanide concentration, nature of the cyanide (free or complexed) constitute other process variables which the skilled worker will readily adapt to. As the data within show, the process variables can be changed over a rather broad range to affect the amount of cyanide oxidized. No inviolate rules can be stated for the degree of cyanide which should be removed; our previous comments showed no standard was applicable to all feedstocks and discharges. One desirable characteristic of our process is that removal of 90% of the cyanide is routine, removal of 95% is not difficult, and removal of greater than 98% is well within process capabilities.

The process of my invention can be practiced in a multiplicity of modes. Although practicing the invention using a water-insoluble metal chelate is anticipated to be the most widespread mode used, one can envision circumstances where a water-soluble catalyst is preferred. For example, the aqueous stream may come from the mining industry and contain a considerable amount of solids. Removal of the solids prior to oxidation of cyanide would lead to a solid mass containing substantial amounts of cyanide which itself might present serious disposal problems. In such a case it may be advantageous to use a water-soluble metal chelate to catalyze the oxidation of cyanide. It also should be clear that propitious choice of the metal in the metal chelate needs to be made in order to minimize contamination by the metal of the metal chelate when the aqueous stream is later disposed of.

As previously alluded to, in the vast majority of cases it is expected that a water-insoluble metal chelate will be used in order to effect a heterogeneous catalysis of cyanide oxidation. In such a mode it is advantageous to impregnate the metal chelate on a water-soluble carrier, as described above, in order to effect as high a dispersal of the metal chelate as possible. One mode of oxidation would employ, or be analogous to, a slurry reactor, where the water-insoluble metal chelate, preferably dispersed on a water-insoluble carrier, is suspended in the aqueous feedstock and reaction is carried out using this well mixed suspension. Slurry reactions can be carried out either batchwise or continuously. In the continuous mode solids are removed from the feedstock after oxidation of cyanide and mixed with and resuspended in fresh feedstock passing into a slurry reactor.

However, it is contemplated that the process of our invention will be most useful when practiced in a continuous mode using a packed bed of the metal chelate dispersed on a suitable support. The cyanide-laden feedstock can be passed either upflow or downflow, and the oxygen passed either concurrently or countercurrently. In yet another variation, suitable where the cyanide concentration is less than about 15 ppm, the feedstock can be saturated with oxygen prior to being contacted with the metal chelate in the reaction zone. As discussed previously, the level of oxygen dissolved in water is sufficient to oxidize up to about 15 parts per million cyanide, which accounts for the operability of the last described embodiment.

Even though the continuous oxidation of cyanide using a packed bed of a metal chelate dispersed on a suitable support may be practiced in any of the aforementioned modes, it has been found that a cocurrent oxygen feed appears to lead to oxygen-starved media and thereby limits the amount of cyanide which can be oxidized under a given set of experimental conditions. Accordingly, we have found it preferable to operate a packed bed reactor in a trickle bed mode with countercurrent oxygen flow, that is, the aqueous feedstock flows downward over the packed catalyst bed and the oxygen is passed upward through the packed catalyst bed. It is anticipated that in this mode it is feasible to satisfactorily oxidize cyanide at concentrations at least as high as about 500 ppm when working at a pressure of air (as the sole oxygen source) of 1 atmosphere and a reaction temperature no more than about 95° C. It is expected that substantially higher cyanide concentrations can be used at higher partial pressures of oxygen and higher reaction temperatures.

The basic process also is susceptible of many variants. For example, cyanide-laden streams often contain many other undesirable materials, especially heavy metals, in addition to cyanide. Some processes first remove such heavy metals by precipitation prior to oxidation of cyanide; see U.S. Pat. No. 4,615,873 and U.S. Pat. No. 4,622,149. However, a potential disadvantage is that the resulting sludge may itself contain rather high levels of cyanide, whether occluded or not. Consequently, it is envisioned as possibly advantageous to first oxidize the cyanide in such streams and subsequently remove the heavy metals from the cyanide-depleted effluent. It also may be desirable to enhance the metal chelate-catalyzed oxidation of cyanide by continuous irradiation in the reaction zone, since it appears that there may be a substantial contribution to cyanide oxidation via a photochemical path.

Other embodiments and variants will be apparent to the skilled worker, all of which are intended to be encompassed within and subsumed by our invention as claimed. The following examples merely illustrate several aspects of this invention. The examples are not intended to be exhaustive nor to restrict our invention in any way, and in particular our invention is not to be thought of as being limited to the examples themselves.

EXAMPLE 1

Demonstration of cyanide oxidation by unsupported cobalt phthalocyanine.

The apparatus consisted of a one-necked round bottom flask equipped with a magnetic stirrer and open to the air. Into each of two such flasks were introduced 75 cc of 0.1M aqueous KCN and 25 cc of 0.01M aqueous KOH. Tetrasulfonated cobalt phthalocyanine (0.66 g) was added to just one of the flasks. The solutions were stirred four hours, stoppered, allowed to remain overnight then stirred for two additional hours, all at ambient temperature. The two solutions were analyzed by ion exchange chromatography with the results summarized in Table 1.

TABLE 1

| Solution Description | Initial CN⁻ wt. % | Product Analysis CN⁻, wt. % | OCN⁻, wt. % |
|---|---|---|---|
| Without phthalocyanine | 0.19 | 0.17 | 0.004 |
| With phthalocyanine | 0.19 | 0.06[a] | 0.015 |

[a]5.8 moles of cyanide were oxidized for every mole of phthalocyanine.

EXAMPLE 2

Four experiments were performed using a simple apparatus consisting of a one-necked round bottom flask equipped with a magnetic stir bar. When an oxygen atmosphere was required the flask was attached to an oxygen reservoir via lines having valves which were arranged so that air could be replaced by oxygen.

Demonstration of catalytic activity

This set of experiments was performed to show the effectiveness of the metal chelates as catalysts for the oxidation of cyanide in aqueous solutions. All aqueous solutions were 0.01 molar in potassium hydroxide. In experiment 1, the solution contained potassium cyanide (0.0033 weight percent = 0.0013 weight percent CN) but no catalyst. In experiment 2, the solution contained 0.03 g supported monosulfonated cobalt phthalocyanine prepared as described in U.S. Pat. No. 4,157,312 in addition to the same levels of potassium hydroxide and potassium cyanide used in experiment 1. Experiment 3 used the same aqueous potassium hydroxide solution containing catalyst but no potassium cyanide, and this time stirring was under oxygen. Experiment 4 used an aqueous solution containing the same levels of potassium hydroxide, potassium cyanide and supported cobalt phthalocyanine as experiment 2, but this time the stirring was under oxygen. At the end of the designated times concentrations of cyanide and cyanate in the aqueous systems were determined by ion exchange chromatography. The results are summarized in Table 2.

TABLE 2

Catalytic Effect of a Cobalt Phthalocyanine

| Experiment | Time (Hr) | Temp (°C.) | Product Analysis[a] CNO⁻ | CN⁻ |
|---|---|---|---|---|
| 1 | 0.5 | 28 | <0.0002 | 0.0013 |
| 2 | 0.5 | 28 | 0.0002 | 0.0009 |
| 3 | 3 | 22 | <0.0002 | <0.00001 |
| 4 | 4.5 | 22 | 0.0004 | <0.00001 |

[a]Analyses in weight percent as determined by ion chromatography.

Comparison of the results for experiments 1 vs 2 show both disappearance of cyanide as well as appearance of cyanate, demonstrating the oxidation of cyanide. Because such low levels of cyanide and cyanate were being determined, experiment 3 was run to confirm that neither of these were present on the carbon support as an impurity which could leach into the aqueous solution. No cyanide or cyanate was observed after three hours. Finally, we essentially repeated experiment 2 but under conditions we hoped would demonstrate complete reaction of cyanide, namely longer time and oxygen instead of air. To the limit of detection by our analytical method we did achieve complete conversion of cyanide in this experiment. Although we observed cyanate in experiments 2 and 4 not enough of it was formed to account for the amount of cyanide converted. This is because there are other oxidation products, namely carbon dioxide and nitrogen. We separately demonstrated these are products under our experimental conditions by determining their presence in the gas phase by mass spectroscopy.

EXAMPLE 3

Continuous oxidation of aqueous cyanide

A glass reactor was loaded with 40 cc of a fresh sample of monosulfonated cobalt phthalocyanine supported on carbon (see the prior example) on a perforated glass plate which was permanently affixed to the inside of the reactor to support the catalyst. A liquid solution containing hydroxide and cyanide was passed downflow through this catalyst, and through a separate opening in the wall of the glass reactor was passed a stream of air. The opening was below the catalyst bed so the flow of air was upflow (countercurrent to the aqueous feed). In addition to the reactor the plant consisted of a simple pump for the aqueous feed geared for very low pump rates, a flowmeter to measure the air flow rate, and heating tape wrapped around the reactor for times when temperatures above ambient were wanted. The reactor contained a thermowell down the center which allowed measurement of the temperature via a thermocouple at the radial center of and approximately half way down the catalyst bed. Although various aqueous feed rates were used all of them were low enough so that the bed never became liquid full, and our operation of the plant is best described as a trickle bed operation rather than a flooded bed. It is important to state that because of the way we operated there was never an ebullition of the catalyst particles—the air was able to pass upflow through the catalyst bed relatively easily through channels or openings between catalyst particles. The mode of operation allowed relatively high levels of oxygen (as air) to be brought into contact with the catalyst. The low solubility of air in water means that if a liquid full reactor concept were used only dissolved air would be available for cyanide oxidation—an amount of air sufficient for oxidation of tens of ppm of cyanide but not hundreds of ppms. Some representative results are given in Table 3 and summarized in Table 4.

The data clearly show the favorable effects of decreasing pH, and that conversions of more than 95% cyanide can be readily obtained without difficulty.

TABLE 3

Continuous Oxidation of an Aqueous Cyanide Stream

| | FEED | | | | | PRODUCT | |
|---|---|---|---|---|---|---|---|
| TIME | CYANIDE[a] | LHSV[b] | AIR[c] | TEMP (°C.) | pH | CYANIDE[a] | CYANATE[a] |
| 0 | 297 | 0.12 | 258 | 22 | 12 | 300 | 38 |
| 15.8 | 297 | 0.12 | 258 | 22 | 12 | 300 | 39 |
| 23.5 | 297 | 0.12 | 258 | 22 | 12 | 310 | 31 |
| 40.6 | 297 | 0.12 | 258 | 22 | 12 | 330 | 33 |
| 47.8 | 297 | 0.12 | 258 | 22–53 | 12 | 280 | 74 |
| 63.4 | 297 | 0.12 | 258 | 53 | 12 | 190 | 120 |
| 71.6 | 297 | 0.12 | 258 | 53 | 12 | 200 | 120 |

TABLE 3-continued

Continuous Oxidation of an Aqueous Cyanide Stream

| | FEED | | | | | PRODUCT | |
|---|---|---|---|---|---|---|---|
| TIME | CYANIDE[a] | LHSV[b] | AIR[c] | TEMP (°C.) | pH | CYANIDE[a] | CYANATE[a] |
| 99.5 | 297 | 0.12 | 258 | 53 | 12 | 210 | 120 |
| 120.5 | 297 | 0.12 | 258 | 53 | 12 | 200 | 130 |
| 134.5 | 297 | 0.12 | 258 | 53 | 12 | 190 | 130 |
| 155.3 | 299 | 0.12 | 258 | 53–74 | 12 | 147 | 200 |
| 179.3 | 299 | 0.12 | 258 | 74 | 12 | 166 | 171 |
| 187.9 | 299 | 0.12 | 258 | 74 | 12 | 156 | 152 |
| 203.7 | 299 | 0.12 | 258 | 74 | 12 | 140 | 150 |
| 232 | 299 | 0.05 | 258 | 74 | 12 | 87 | 161 |
| 268.3 | 299 | 0.05 | 258 | 74 | 12 | 52 | 180 |
| 292.3 | 299 | 0.05 | 258 | 74 | 12 | 35 | 161 |
| 316.3 | 299 | 0.05 | 258 | 74 | 12 | 23 | 165 |
| 340.3 | 299 | 0.05 | 258 | 74 | 12 | 22 | 158 |
| 363.3 | 285 | 0.05 | 258 | 74 | 10.8 | 27 | 183 |
| 424.8 | 285 | 0.05 | 258 | 74 | 10.8 | 16 | 135 |
| 435.8 | 285 | 0.05 | 258 | 74 | 10.8 | 3 | 105 |
| 459.8 | 285 | 0.05 | 258 | 74 | 10.8 | 3 | 66 |
| 483.8 | 285 | 0.05 | 258 | 74 | 10.8 | 2 | 60 |
| 507.8 | 285 | 0.05 | 258 | 74 | 10.8 | 2 | 54 |
| 531.8 | 285 | 0.05 | 258 | 74 | 10.8 | 1 | 51 |
| 583.8 | 285 | 0.05 | 258 | 74 | 10.8 | 1 | 48 |
| 627.8 | 285 | 0.05 | 258 | 74 | 10.8 | 2 | 48 |
| 652.6 | 285 | 0.19 | 258 | 74 | 10.8 | 46 | 66 |
| 675.8 | 298 | 0.16 | 258 | 74 | 10.8 | 67 | 70 |
| 699.8 | 298 | 0.16 | 258 | 74 | 10.8 | 26 | 71 |
| 730.8 | 298 | 0.16 | 258 | 74 | 10.8 | 16 | 71 |
| 754 | 298 | 0.16 | 258 | 74 | 10.8 | 23 | 71 |
| 771.8 | 298 | 0.16 | 258 | 74 | 10.8 | 30 | 71 |
| 795.8 | 298 | 0.16 | 258 | 74 | 10.8 | 32 | 73 |
| 818.8 | 298 | 0.16 | 258 | 75 | 10.8 | 61 | 73 |
| 842.8 | 298 | 0.054 | 258 | 75 | 10.8 | 27 | 106 |
| 896.6 | 298 | 0.03 | 258 | 75 | 10.8 | 0.3 | 41 |
| 914.9 | 280 | 0.029 | 258 | 74 | 10.8 | <1 | 34 |
| 938.9 | 280 | 0.027 | 258 | 75 | 10.8 | 0.08 | 33 |
| 963.4 | 280 | 0.028 | | 72 | 10.8 | <1 | 30 |
| 986.9 | 280 | 0.024 | 15 | 87 | 10.8 | 1 | 92 |
| 1010.4 | 280 | 0.025 | 15 | 77 | 10.8 | <1 | 86 |
| 1067.4 | 280 | 0.028 | 15 | 75 | 10.8 | <1 | 85 |
| 1082.9 | 280 | 0.026 | 15 | 75 | 10.8 | 0.2 | 86 |
| 1106.4 | 280 | 0.028 | 15 | 72 | 10.8 | <1 | 92 |
| 1130.4 | 280 | 0.025 | 15 | 19 | 10.8 | <1 | 96 |
| 1154.4 | 280 | 0.027 | 15 | 19 | 10.8 | 0.5 | 91 |
| 1178.4 | 280 | 0.024 | 15 | 20 | 10.8 | 8 | 113 |
| 1229.4 | 280 | 0.027 | 15 | 19 | 10.8 | 21 | 124 |
| 1250.4 | 280 | 0.026 | 15 | 19 | 10.8 | 29 | 116 |
| 1274.4 | 280 | 0.027 | 15 | 20 | 10.8 | 30 | 116 |
| 1298.4 | 280 | 0.025 | 15 | 20 | 10.8 | 36 | 157 |
| 1322.4 | 280 | 0.025 | 15 | 20 | 10.8 | 46 | 151 |
| 1346.1 | 280 | 0.222 | 258 | 20 | 10.8 | 63 | 50 |
| 1354.1 | 280 | 0.128 | 258 | 20 | 10.8 | 99 | 30 |
| 1374.4 | 280 | 0.133 | 258 | 20 | 10.8 | 116 | 27 |
| 1401.4 | 280 | 0.134 | 258 | 20 | 10.8 | 136 | 30 |

[a]Concentration in parts per million (ppm).
[b]Liquid Hourly Space Velocity.
[c]Air flow in cc/min.

TABLE 4

Oxidation of Cyanide with a Cobalt Phthalocyanine Catalyst in a Trickle Bed Reactor

| Aqueous Feed pH | LHSV, hr$^{-1}$ (Aq. Feed)[a] | Flow, cc/min. | Temp °C. | Product Analysis[b] | |
|---|---|---|---|---|---|
| | | | | CNO$^-$ | CN$^-$ |
| 12 | 0.12 | 258 | 53 | 120 | 200 |
| 12 | 0.12 | 258 | 74 | 152 | 156 |
| 12 | 0.05 | 258 | 74 | 165 | 23 |
| 10.8 | 0.05 | 258 | 74 | 58 | 1 |
| 10.8 | 0.16 | 258 | 74 | 71 | 30 |

[a]LHSV is liquid hourly space velocity defined as cc of aqueous feed per cc of catalyst per hour.
[b]Analyses in parts per million (ppm) as determined by ion chromatography.

What is claimed is:

1. A method of reducing the cyanide concentration in an aqueous stream comprising oxidizing the cyanide with an oxidizing agent selected from the group consisting of oxygen, ozone, and hydrogen peroxide in the presence of a catalytically effective amount of a metal chelate at oxidation conditions, where said metal chelate is selected from the group consisting of metal compounds of tetrapyridinoporphyrazine, porphyrin, corrinoid materials, and the phthalocyanines, wherein said oxidizing conditions include a pH from about 7 to about 14, and said cyanide is converted to cyanate, nitrogen, and carbon dioxide.

2. The method of claim 1 where the metal chelate is water soluble.

3. The method of claim 1 where the metal chelate is water insoluble.

4. The method of claim 1 where the metal chelate is water insoluble and supported on a water-insoluble carrier.

5. The method of claim 4 where the carrier is selected from the group consisting of graphite charcoal, zeolitic and molecular sieve materials, naturally occurring clays and silicates, and refractory inorganic oxides.

6. The method of claim 5 where the carrier is charcoal.

7. The method of claim 1 where the metal in the metal chelate is selected from the group of iron, cobalt, and vanadium.

8. The method of claim 7 where the metal chelate is a cobalt chelate.

9. The method of claim 1 where the metal chelate is a sulfonated cobalt phthalocyanine.

10. The method of claim 1 where oxidation conditions include a temperature from about 20° C. up to about 150° C. and a total pressure from about 1 atmosphere up to about 10 atmospheres.

11. The method of claim 1 where oxidation conditions include a pH from about 9 to about 12.

12. The method of claim 1 where the cyanide concentration is reduced by at least 90 percent.

13. The method of claim 12 where the cyanide concentration is reduced by at least 95 percent.

14. The method of claim 13 where the cyanide concentration is reduced by at least 98 percent.

15. A method of reducing the cyanide concentration in an aqueous stream by oxidizing the cyanide with oxygen in the presence of a metal chelate as a catalyst comprising flowing at oxidizing conditions the cyanide-containing aqueous stream through a bed of a catalytic composite at cyanide oxidizing conditions, said composite comprising a metal chelate supported on a carrier, wherein said metal chelate is selected from the group consisting of metal compounds of tetrapyridinoporphyrazine, porphyrin, corrinoid materials, and phthalocyanines, flowing an oxygen-containing gas countercurrently through said bed, and removing the effluent having a reduced cyanide concentration, wherein said oxidizing conditions include a pH from about 7 to about 14, and said cyanide is converted to cyanate, nitrogen, and carbon dioxide.

16. The method of claim 15 where the aqueous stream flows down through the bed.

17. The method of claim 15 where the carrier is selected from the group consisting of charcoal, naturally occurring clays and silicates, and refractory inorganic oxides.

18. The method of claim 17 where the carrier is charcoal.

19. The method of claim 15 where the metal chelate is a cobalt chelate.

20. The method of claim 15 where the metal chelate is a sulfonated cobalt phthalocyanine.

21. The method of claim 15 where oxidation conditions include a temperature from about 20° C. up to about 150° C. and a total pressure from about 1 atmosphere up to about 10 atmospheres.

22. The method of claim 15 where oxidation conditions include a pH from about 9 to about 12.

23. The method of claim 15 where the cyanide concentration is reduced by at least 90 percent.

24. The method of claim 23 where the cyanide concentration is reduced by at least 95 percent.

25. The method of claim 24 where the cyanide concentration is reduced by at least 98 percent.

* * * * *